(12) United States Patent
Apte et al.

(10) Patent No.: US 10,606,828 B2
(45) Date of Patent: Mar. 31, 2020

(54) STORAGE CORRELATION ENGINE

(71) Applicant: JPMorgan Chase Bank, N.A., New York, NY (US)

(72) Inventors: Ashish M. Apte, Singapore (SG); Atul Suresh Dongre, Singapore (SG); Puneet Agarwal, Singapore (SG); Sreenu Daram, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 203 days.

(21) Appl. No.: 15/787,773

(22) Filed: Oct. 19, 2017

(65) Prior Publication Data
US 2019/0272338 A1    Sep. 5, 2019

(51) Int. Cl.
| G06F 16/23 | (2019.01) |
| G06F 7/00 | (2006.01) |
| G06F 16/215 | (2019.01) |
| G06F 16/25 | (2019.01) |

(52) U.S. Cl.
CPC .......... *G06F 16/2365* (2019.01); *G06F 7/00* (2013.01); *G06F 16/215* (2019.01); *G06F 16/2379* (2019.01); *G06F 16/252* (2019.01)

(58) Field of Classification Search
USPC ...................................................... 711/159
See application file for complete search history.

(56) References Cited

U.S. PATENT DOCUMENTS

| 5,829,044 | A * | 10/1998 | Sono | G11B 27/031 |
| | | | | 711/156 |
| 7,590,664 | B2 * | 9/2009 | Kamohara | G06F 16/119 |
| 7,716,053 | B2 * | 5/2010 | Shimoda | A63F 13/12 |
| | | | | 704/270 |
| 7,738,014 | B2 * | 6/2010 | Kwak | H04N 5/37455 |
| | | | | 348/222.1 |
| 7,840,595 | B1 * | 11/2010 | Blitzer | G06F 11/1458 |
| | | | | 707/781 |
| 8,022,915 | B2 * | 9/2011 | Lee | G09G 3/3648 |
| | | | | 345/100 |
| 8,150,658 | B2 * | 4/2012 | Beniyama | G06K 9/00201 |
| | | | | 702/189 |
| 8,287,136 | B2 * | 10/2012 | Kobori | H04N 9/3129 |
| | | | | 353/69 |
| 2007/0030186 | A1 | 2/2007 | Archbold et al. | |
| 2014/0115013 | A1 | 4/2014 | Anderson | |
| 2015/0370843 | A1 | 12/2015 | Cavalcanti Dantas, Jr. | |
| 2016/0210307 | A1 | 7/2016 | Pittelko | |

OTHER PUBLICATIONS

Bairavasundaram et al. "An analysis of data corruption in the storage stack," ACM Transactions on Storage (TOS), Nov. 2008, 16 pages.
International Search Report and Written Opinion in International Application No. PCT/US2018/055974 dated Jan. 2, 2019.

* cited by examiner

*Primary Examiner* — Kim T Nguyen
(74) *Attorney, Agent, or Firm* — Greenblum & Bernstein, P.L.C.

(57) ABSTRACT

A method of and system for correlating data from among a disparate group of data sources and providing the correlated data to data consumers via API's and direct transmission of the data are disclosed. Once the validity of the data is verified, the data is translated from a format specific to the data source into a format that is usable by various other data repositories. Thereafter, the data may be provided to data consumers.

20 Claims, 8 Drawing Sheets

STORAGE CORRELATION ENGINE

TECHNICAL FIELD

The present invention relates generally to methods of and systems for ensuring that data flowing from a plurality of sources into a plurality of repositories or directly to data consumers represents the most current and accurate instance of such data.

BACKGROUND

Businesses and other such concerns generate and receive tremendous amounts of data. This data may represent data generated during the day-to-day operations of the business, data related to the environment in which the business operates, business performance data, customer data, employee data, and data related to business assets. This data may be relatively static in nature or may change continuously. Continuously changing data may quickly create problems related to the determination of whether a particular instance of data is accurate or the most up-to-date. Even relatively static data may present issues as the result of multiple copies of the data. Along with issues related to how current a particular set of data might be, the fact that an organization has multiple, distributed data sources may lead to circumstances in which related data is disbursed across a plurality of storage locations. For example, a physical asset may have operational records stored in one location and financial records in another. Thus, there is a real possibility that incomplete or non-current data may be used in a decision-making process unless there exists a means for correlating organizational data across multiple, often diverse, data platforms. For example, data may be extracted from one data source or storage location by an application in order to generate various performance and status reports. These reports may be presented to management personnel to allow those personnel to make decisions on behalf of the business. In a case where the extracted data conflicts with or is less current than similar data from other sources, the resulting reports and thus decisions made in reliance on those reports, may be less optimal than would be the case when the extracted data has been correlated between the various data sources. Additionally, data from dispersed storage locations may be inadvertently left out of the information provided to decision makers. For at least the above stated reasons, the large amounts of data that are frequently retained by businesses would become difficult or impossible to manage using a manual process, thus necessitating an automated correlation process. Thus, what is needed is an automated method of and system for correlating data held in various repositories throughout an organization.

SUMMARY

The general inventive concepts encompass methods of and systems for correlating data that is stored in a plurality of data repositories throughout an organization.

In an exemplary embodiment, a method of correlating data among the various storage locations and data sources involves providing the data to a correlation engine. The correlation engine extracts data from each of these storage locations and data sources and analyzes each piece of data in order to determine if the received data is current with regard to other copies of the data stored across the organization.

In some exemplary embodiments, the extraction of data is performed using a collection script.

In some exemplary embodiments, the correlation engine extracts data from a storage location and compares the extracted data to other copies of the data that were extracted from the same storage location.

In some exemplary embodiments of the invention, the correlation engine extracts data from a storage location and compares the extracted data to other copies of the data that were created before the extracted data.

In an exemplary embodiment, a system for correlating data among the various storage locations and data sources. The system comprises a plurality of data sources, storage locations, and a correlation engine. The correlation engine receives data from each of these storage locations and data sources and analyzes each piece of data in order to determine if the received data is current with regard to other copies of the data stored across the organization. In this manner, it is possible to ensure that the data is properly associated with, corresponding, or otherwise related data throughout the organization.

In an exemplary embodiment of the invention, data is extracted from a data source through the use of data collection scripts that retrieve the data. In addition to the data itself, additional information on switches, ports, zones, and configurations and the like can also be determined or otherwise obtained. This additional information is typically not extracted from the data source from which the data is extracted. Instead, this additional information related to infrastructure data that can be used to determine relationships between the various data sources to enable association of data across a distributed computing architecture. The retrieved data is checked for validity including, checks to determine if there were reported extraction errors, checks of the data size against the data size from a previous extraction to determine if the data sets comprise the expected number of elements (e.g., match), and parsing of the extracted data in order to compare the various parsed elements against similarly parsed elements from a previous extraction. In an exemplary embodiment, if the extracted data is found to be invalid, the data previously stored is retained, while the retrieved data is discarded as invalid. Conversely, if the extracted data is found to be valid, data conversion operations are performed on the data to prepare it for correlation with other data sources and eventual consumption. For example, in some exemplary embodiments, data is parsed and reformatted such that it becomes agnostic with regard to its original storage format. In other exemplary embodiments, the data may be subject to various translation functions. In still other exemplary embodiments, the data may be parsed into different arrangements such as into a columnar format. For example, after parsing and validation, the data from a plurality of sources is correlated and inserted into a data model that is standardized such that data retrieved from different vendors is stored in a consistent and vendor agnostic manner. This data may be extracted by an application program interface (API). In addition to an API, the standardized data is inserted into data lakes for consumption by various groups across diverse platforms throughout an organization. Providing the data to data lakes allows users outside of secure storage to obtain performance data. Example performance data, without limitation, may include TOPS, response time or latency, throughput or MBPS (read and write). In some exemplary embodiments, extracted data that is found to be valid is reformatted such that its format is compatible with each of a first storage location, a second storage location, and a third storage location.

After the data extraction, data size check, data validity check, and data conversions are complete, the resulting data is provided to a correlation database processing and storage. The correlation database also comprises a table into which the data from the previous day is moved. In some exemplary embodiments, data from previous days is stored for a rolling period of time (e.g., six months) in order to provide a source of historical information.

Once the data is stored in the correlation database, the data is made available to various points of use. In some exemplary embodiments, these points of use may include data lakes, various programs (for example, efficiency programs), data migration and refresh functions, and operations groups (for example, billing and capacity management). In some exemplary embodiments, the shared data is made accessible by providing one or more application program interfaces (APIs) to facilitate access to the data stored in the correlation database. In some exemplary embodiments, the shared data is made accessible by providing a microservice architecture interface.

In some exemplary embodiments, data from the correlation database is provided to specialized storage (e.g., data lakes) for consumption throughout the organization, without requiring the consumer of the information to retrieve the data directly from the correlation engine. In still other exemplary embodiments, the data may be provided directly to various applications for consumption. These approaches to accessing the correlated data ensure that data consumers can continue to access information in a manner that they are accustomed to while receiving the benefit of data processed by the data correlation engine.

In other exemplary embodiments, the method steps and functions described herein may be performed using a system that comprises a processor and a memory, the memory further comprising instructions that, when executed by the processor, result in the performance of the aforementioned method steps and functions.

The above and other aspects and advantages of the general inventive concepts will become more readily apparent from the following description and figures, illustrating by way of example the principles of the general inventive concepts.

BRIEF DESCRIPTION OF THE DRAWINGS

These and other features of the general inventive concept will become better understood with regard to the following description and accompanying drawings in which.

DETAILED DESCRIPTION

Organizations (businesses, charities, hospitals, schools, etc.) very often have large amounts of data that must be maintained by the organization. This data may be data that is received from sources external to the organization or may be data that results from the operations of the organization itself. For example, external information may be obtained from governmental bodies, customers, or commercial data providers. Internal data may be data that is generated as the result of normal business operations or may be derived from the analysis of business operations data, external data, or a combination of both. Because both internal and external data may be continuously changing and distributed across the organization for storage and use, it is very likely that certain instances of data throughout the organization may be inconsistent with other instances. It is also likely that related segments of data may be distributed across the organization. Both of these situations may be more prevalent in large decentralized businesses (e.g., banks). Depending upon the amount of difference between the various instances of data and the nature of the data, these differences could result in significant levels of confusion and less than optimal business decisions.

The general inventive concepts encompass, a data correlation engine that extracts data from storage locations and data sources throughout the organization and correlates this data between the various sources. The resulting correlated data may be stored in a storage correlation database which is a part of the correlation engine. Alternatively, the storage correlation database could be external to the correlation engine. In some instances, a storage correlation database is not used at all.

Figure 1:
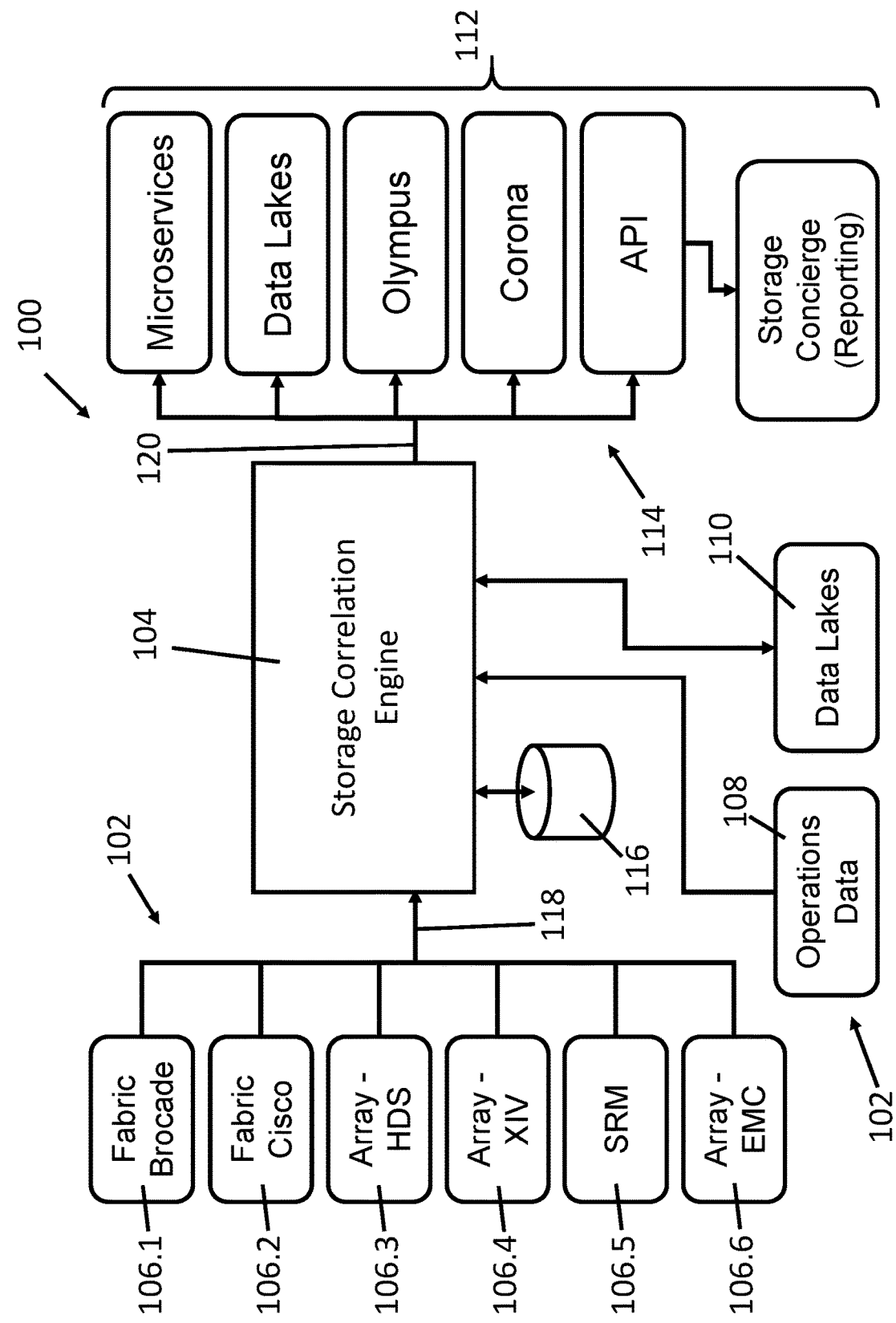
FIG. 1 is a diagram illustrating various data sources and repositories in communication with a storage correlation engine which is in communication with various data consumers, according to an exemplary embodiment.

A system 100 for correlating data according to an exemplary embodiment, is shown in FIG. 1. The system 100 comprises a correlation engine 104, data sources 102, and data consumers 112. Data 150 received by the correlation engine 104 may be in formats that are unusable by data consumers in its received format. By way of example, such formats may include, but are not limited to, LUN#, Zone names, and World Wide Numbers (WWN). These formats require mapping to hosts and then to line of business and application names. The correlation engine 104 functions as a source to merge storage vendor tools data with data enriched by data enrichment functions available to the organization. For example, a host receives storage data from three data storage frames. The example host has two host bus adapters (HBAs) connected to two switches (from an odd data fabric and an even data fabric). Thus, the host is zoned, mapped, and masked to three storage frames. Additionally, each frame has its own performance values. The received storage data 150 needs to be tied from a line of business (LoB) application level. In order to understand the storage allotted to this host and the host performance in this example, data from all three frames must be merged.

In some exemplary embodiments, an abstraction layer formed by the correlation engine 104 is provided between the data provided by the storage vendor tools and the consumption of such data by the organization. In an exemplary embodiment, each data source 102 may be from a different vendor platform. The abstraction layer functions to transform data 150 collected from various sources 102 into a standardized, vendor agnostic format. This standardized, vendor agnostic data format serves to simplify later operations performed on the data. The result is that the data consumers 112 need not worry about the source of the data or data format.

In many organizations, engineering resources utilize data usage information to identify infrastructure requirements. This data usage information is generated from hardware or software data instrumentation systems that generally are controlled by the engineering resource. In certain exemplary embodiments, these instrumentation systems are positioned such that they are receiving data from the correlation engine 104. In addition to these data instrumentation systems, data storage providers may provide reporting tools that enable users to obtain usage and other data relating to the stored data. However, in organizations which utilize multiple storage providers, users wishing to obtain reporting information may have to consult a plurality of different tools and data sources and then attempt to consolidate the results. In some exemplary embodiments, the system 100 comprises automated data feeds 114 that provide data 120 from a correlation engine database 116 to the data consumers 112. Because these automated data feeds 114 provide correlated data 120 directly to the data consumers 112, they provide an evergreen data source which avoids problems caused by stale or superseded data.

In some exemplary embodiments, the data 118 extracted from these multiple storage providers 102 is made available through an application program interface (API) or microservice functionality. These data interfaces and the consolidation of the data sources 102 make it possible to effectively manage the distribution of large amounts of stored information throughout the organization.

In addition to API and microservice functions, in some exemplary embodiments, the correlated data 120 is sent directly to data lakes 110 maintained by the organization. This direct provisioning of data serves to keep the data available in the data lakes 110 as current and accurate as possible while reducing the amount of involvement by administrative resources required to manage the process. In some exemplary embodiments, one or more user interfaces are provided which allow users to input data directly, thus negating the need for certain data repositories. Such user interfaces may allow the users to enter enrichment data.

Because the data 118 is routed through the correlation engine 104, information pertaining to data clusters, allocation, virtual machines, and other constructs is available to the correlation engine. Thus, in addition to correlating diverse data and distributing the correlated data, in some exemplary embodiments, the system 100 may be configured to calculate data storage consumption and fully automate the billing process for storage services.

As noted above, the correlation engine 104 is in communication with a plurality of data sources 102. These data sources 102 may be specific data repositories 106. The data sources 102 may be operations data 108. The data sources 102 may be data lakes 110. Such data sources 102 may be both static and dynamic in nature. For example, a static data repository 106 comprise data items that change infrequently, if at all, such as asset records and various historical records. A dynamic data source 106 comprises data items that are subject to eventual, if not frequent, change. Examples include, without limitation, business performance data, customer or client data, receivables, payables, and other types of data that are not static in nature. There may be redundancy of data between these various sources. In addition to such redundancy, the actual data values stored at the various locations may differ from one location to the next. As a result of these differences, a person or organization making use of the data (i.e., a data consumer 112) may not know which data source reflects the most up-to-date information. To address the potential problems caused by inconsistent or stale data, the data 118 extracted from a specific data repository 106 is supplied to a storage correlation engine 104. The storage correlation engine 104 processes this received data 118 to correlate it between the various specific data repositories 106.1-106.6. The storage correlation engine 104 makes the correlated data 120 available to various data consumers (which may be internal or external to the organization) as is illustrated at 112.

Figure 2:
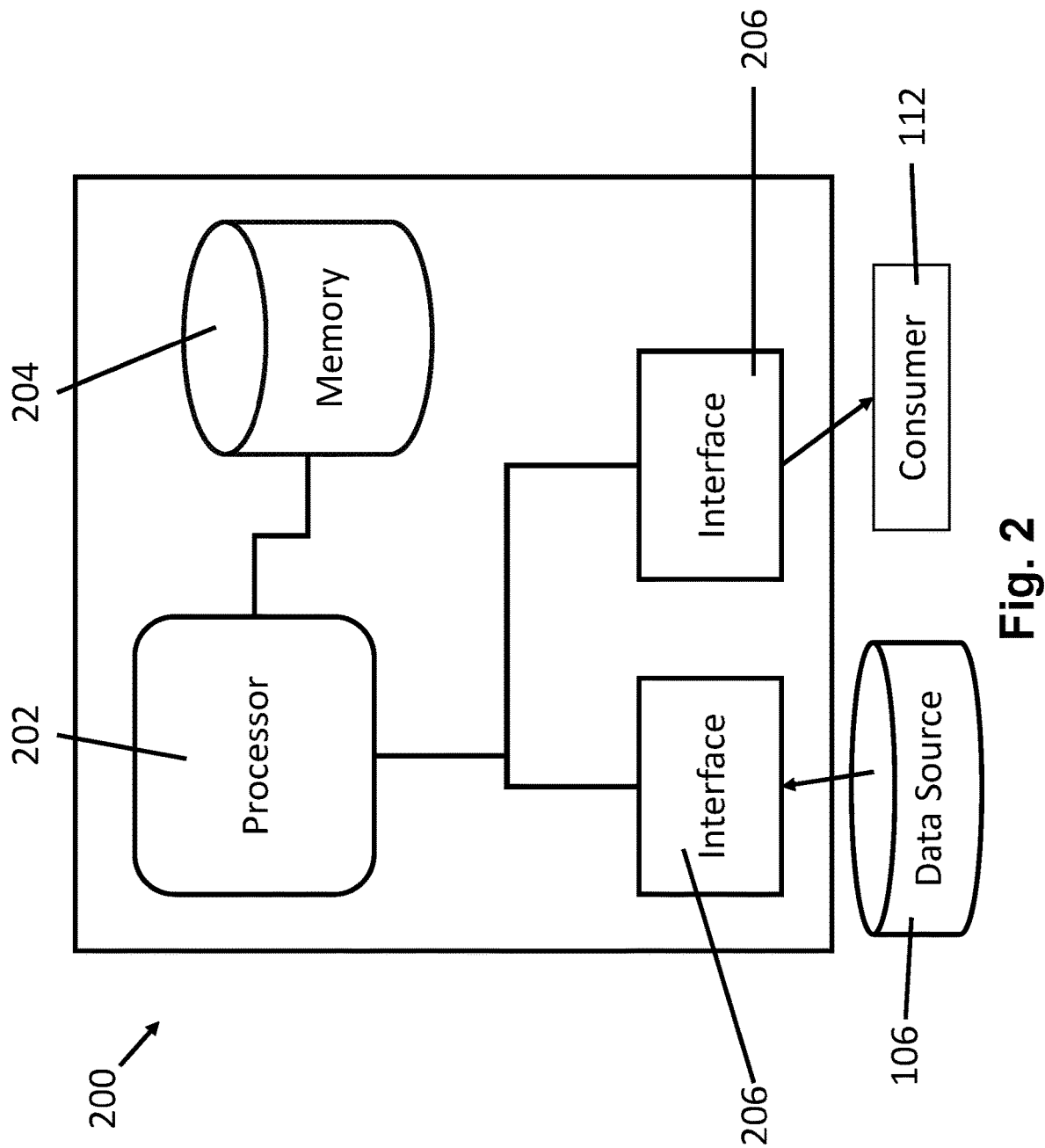
FIG. 2 is a diagram of a correlation engine, according to an exemplary embodiment.

A correlation engine 200 according to an exemplary embodiment, is shown in FIG. 2. The correlation engine 200 comprises a processor 202 in electronic communication with a memory 204. The memory comprises software instructions that configure the processor to perform the steps that are described herein. In addition, the memory may comprise all, none, or part of the data described. Other exemplary embodiments may comprise a plurality of processors and memory locations. In some exemplary embodiments, the system 200 also comprises interfaces 206 that are in communication with various specific data repositories 106 and various consumers 112.

Figure 3A:
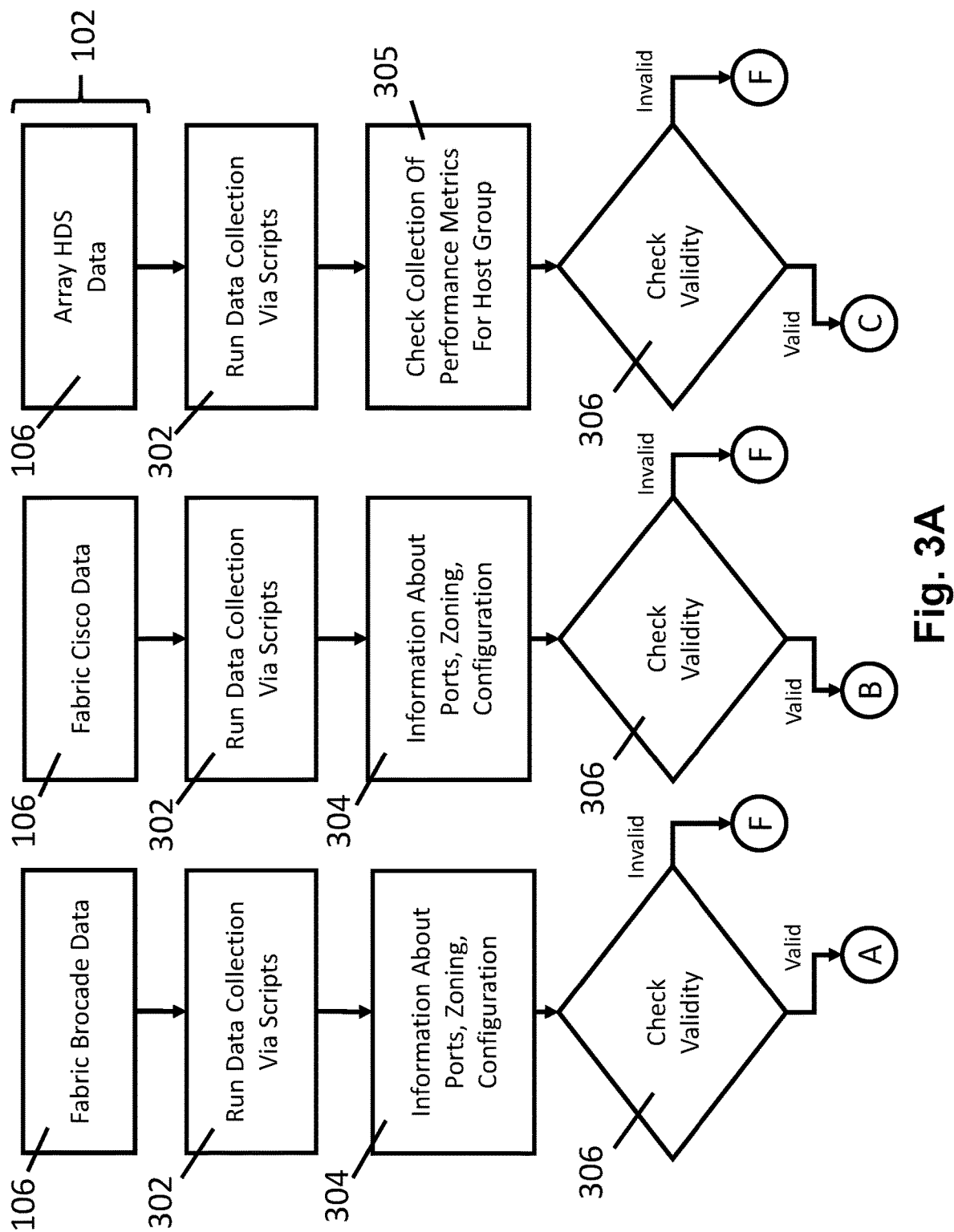
FIGS. 3A-3C are diagrams illustrating the flow of data from various data sources into a correlation engine, according to an exemplary embodiment.
Figure 3B:
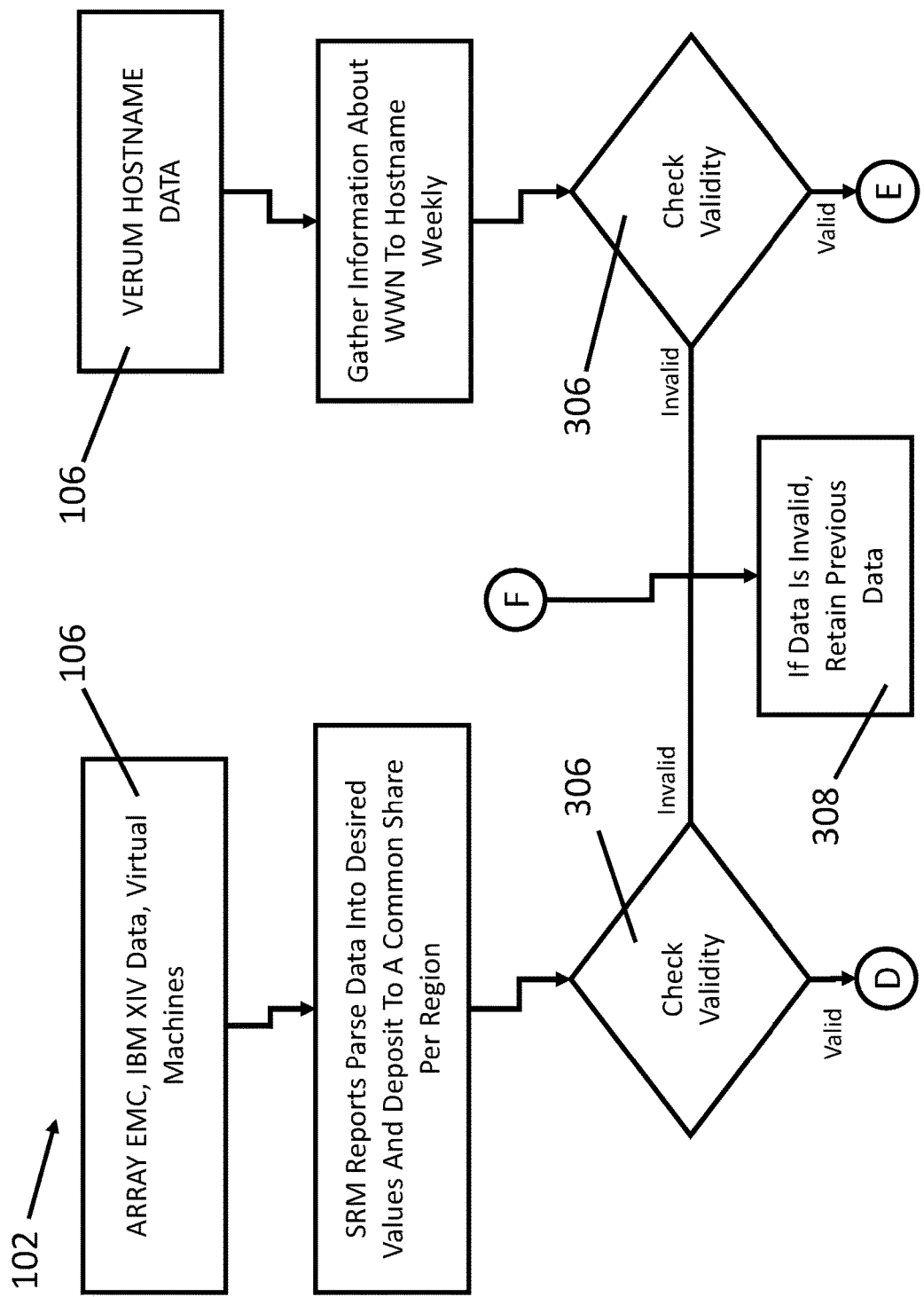
Figure 3C:
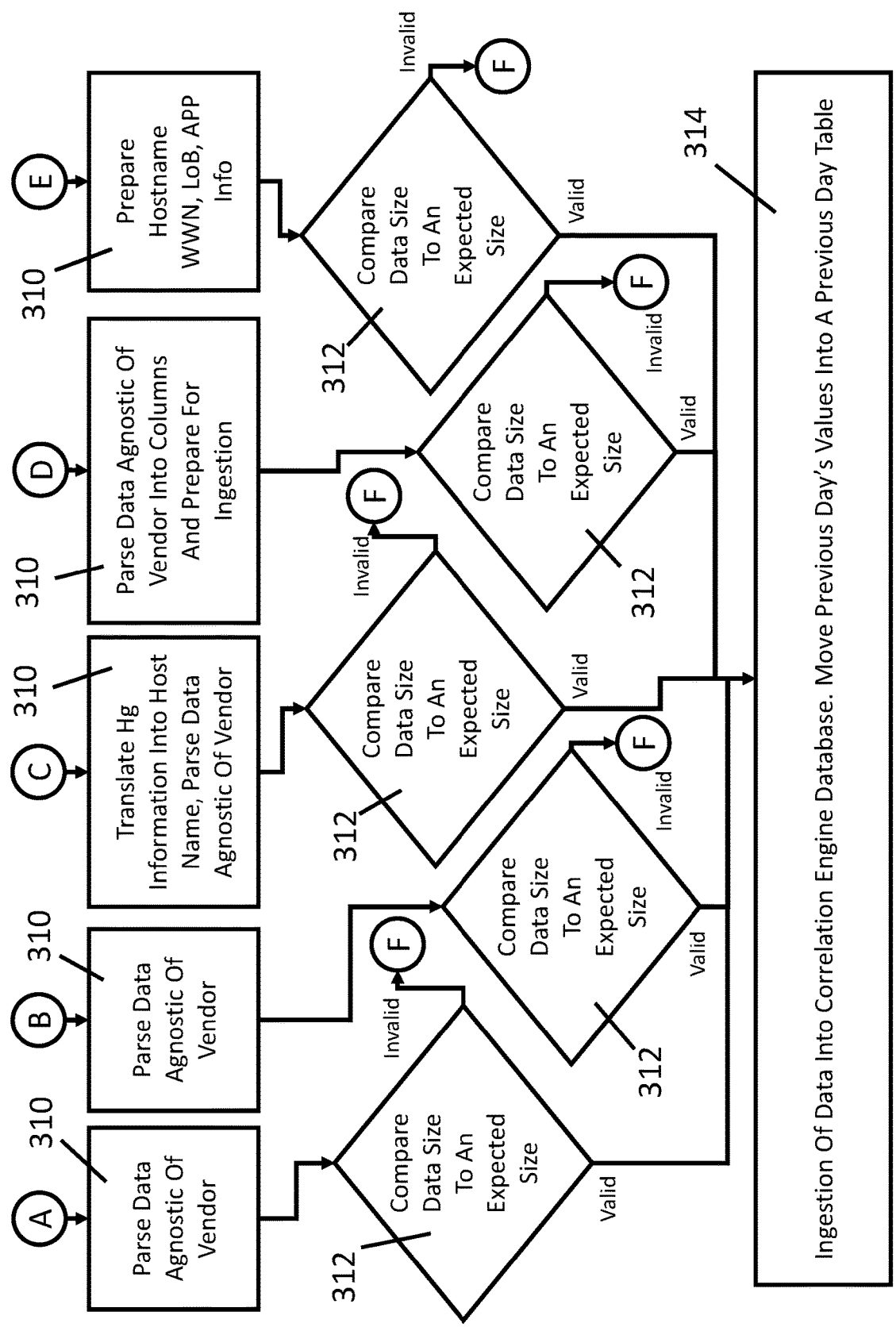
Figure 4:
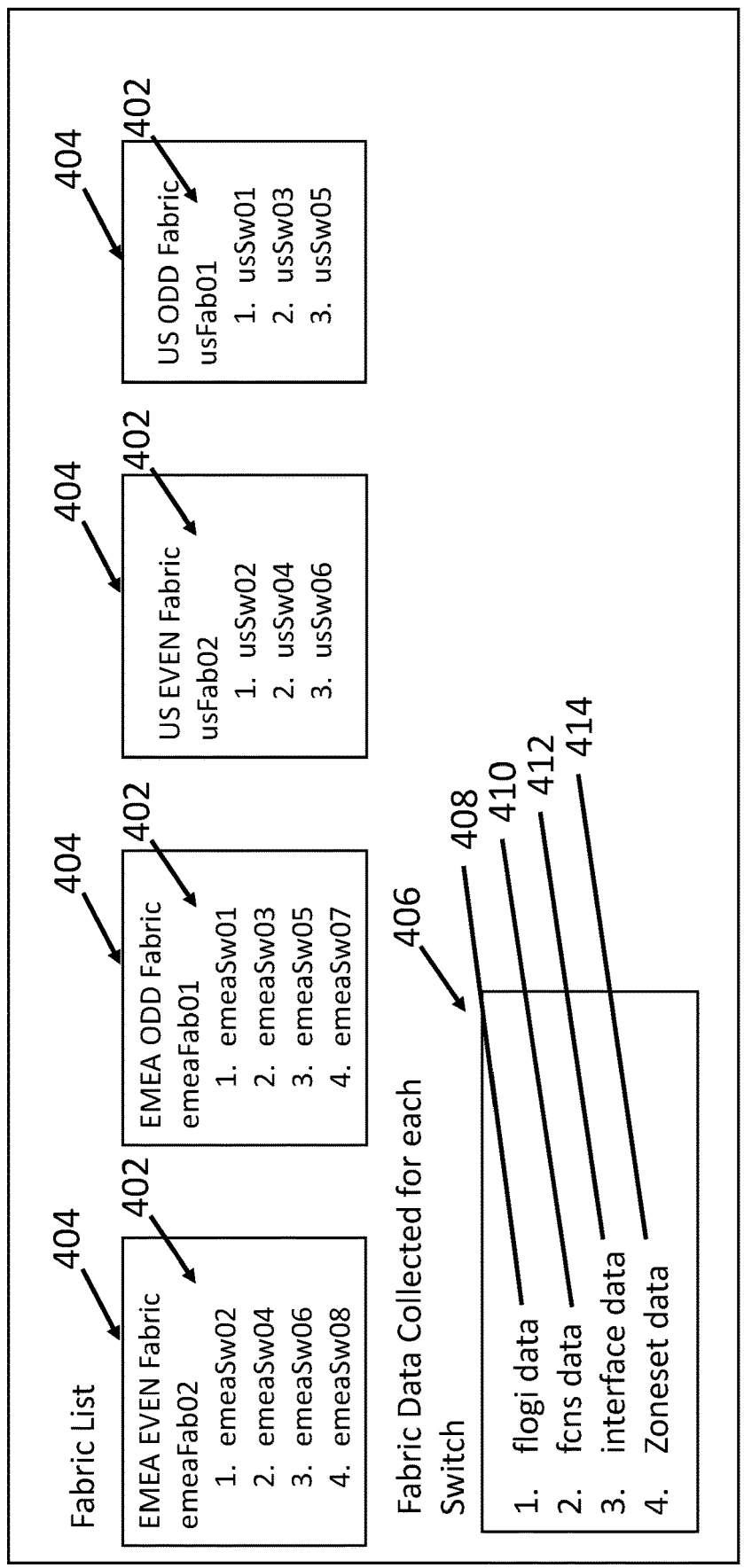
FIG. 4 is an illustration of infrastructure data, according to an exemplary embodiment.

The flow of data 120 from the various distinct data sources 106.1-106.6 the correlation engine 104, according to an exemplary embodiment, is illustrated in FIGS. 3A-3C. The data sources 102 include a plurality of specific data repositories 106.1-106.6, each having a corresponding means 302 for extracting data from the data repositories 106.1-106.6. In certain exemplary embodiments, these means comprise data collection scripts and parsed reporting methods. In some exemplary embodiments, when the data 118 is extracted from the plurality of data sources 102, additional information 304 that is related to the extracted data 118 is obtained. As shown in FIG. 4, with data fabric storage, such additional information 304 may include a listing of switches 402 for each fabric 404. Additionally, fabric data 406 is collected for each switch 402. Such fabric data 406 comprises, for example: fabric login (flogi) data 408; Fabric Channel Name Server (FCNS) data 410; interface data 412; and Zoneset data 414. Other examples of additional information may include performance metrics for certain storage locations 305.

Figure 5:
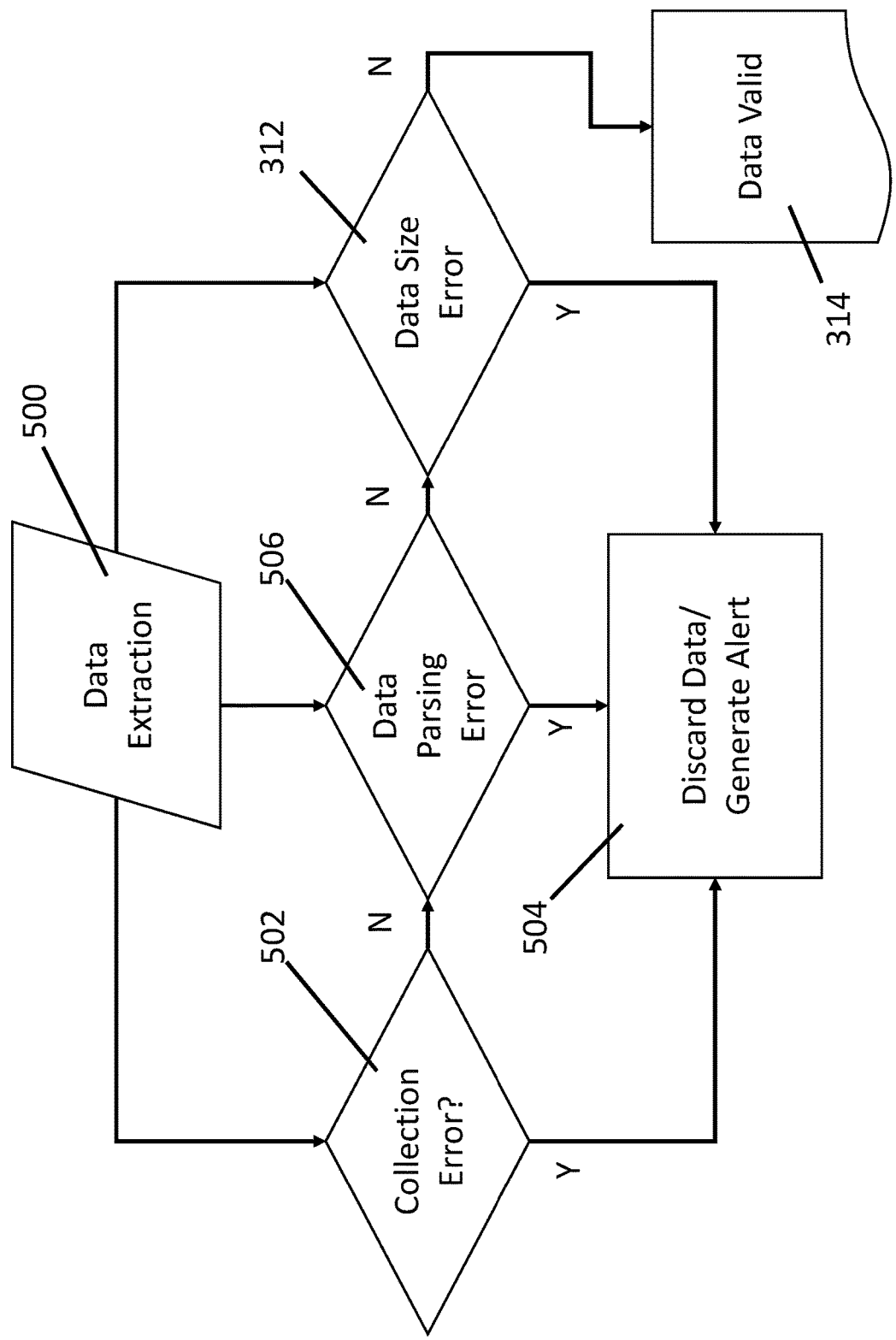
FIG. 5 is a flow chart of the steps taken to verify data, according to an exemplary embodiment.

Once the initial data extraction 500 (including obtaining additional information as necessary) is complete, a validity check 306 is conducted. In this exemplary embodiment, validity checking is comprised of three individual checks. The steps of conducting the validity check according to an exemplary embodiment are illustrated in FIG. 5. The first validity check 502 presumes that the data obtained from element managers is accurate and that reference systems are also accurate. As a result of these presumptions, failures reported during data collection will result in an indication of a collection error. A reported collection error thus results in the discarding 504 of the entire data set for that instance of a data collection (run). For example, if an error is reported from a switch in a data fabric during a data collection, the entire run from that fabric will be considered invalid. If such an error is detected, the data correlation engine will consider the most recent successful data run as the most accurate data. This detected error will be logged and an alert generated.

The second validity check 506 involves data parsing. In data parsing, different types of data sets that have been collected from data fabrics are parsed and then correlated to detect errors. For example, as illustrated in Table 1, flogi data is collected from a first interface. This data comprises a port name. In the second validity check 506, this data is parsed and compared to FCNS data, as illustrated in Table 2. As shown, the port name from the flogi data from interface fc3/1 matches the port name found in the FCNS data. Finding data matching the port name in the FCNS data confirms that the host bus adapter is online and active. Other parsing checks may be performed to confirm data by comparing parsed data from a first source to make sure that it matches parsed data available from a second source. If a comparison results a non-match, at least one of the retrieved data values is inconsistent and thus, fails this second quality check 506. If such an error is detected, the entire fabric data is discarded 504 and an alert is generated.

TABLE 1

Flogi Data

| Interface | VSAN | FCID | Port Name | Node Name |
|---|---|---|---|---|
| fc3/1 | 2050 | 0x550000 | 50:05:07:66:44:44:28:01 | 50:05:07:60:44:02:28:01 |
| Fc3/2 | 2050 | 0x550001 | 50:05:07:60:44:43:5e:09 | 50:05:07:60:44:02:5e:09 |

TABLE 2

FCNS Data

| FCID | Type | PWWN (Vendor) | FC-4Type:Feature |
|---|---|---|---|
| 0x550000 | N | 50:05:07:66:44:44:28:01 (IBM) | Scsi-fcp:target |
| 0x550001 | N | 50:05:07:60:44:43:5e:09 (IBM) | Scsi-fcp:target |

As shown in FIGS. 3A-3C, after the data manipulation process 310 has been performed, a third validity check 312 is performed. In this third validity check 312, the number of records (data size) of the currently retrieved data is compared to a predetermined expected data size. This expected data size is determined by examining historical data size values with an allowance for minor variations. If the data size is found to be valid, the data is ingested 314 into the storage correlation engine database and the previous day's data is then moved into a "previous day" table where, in certain exemplary embodiments, it is saved for a period of time (e.g., up to six months) in order to provide a historical record. If the validity checks result in a determination of invalid data, the previous data 308 is retained and the invalid data 504 is discarded. In such an event, an alert is generated to prompt an investigation into the cause of the invalid data. In this manner, an incomplete or faulty extraction will not result in damage to stored data. This prevents corrupt or invalid data from entering the database maintained by the storage correlation engine 104. Once the data has been found to be valid, a data manipulation process 310 is performed to transform the specific data into a format that is vendor-independent. These data manipulation processes 310 may vary depending upon the type of data received from a specific data repository 106.1-106.6.

Figure 6:
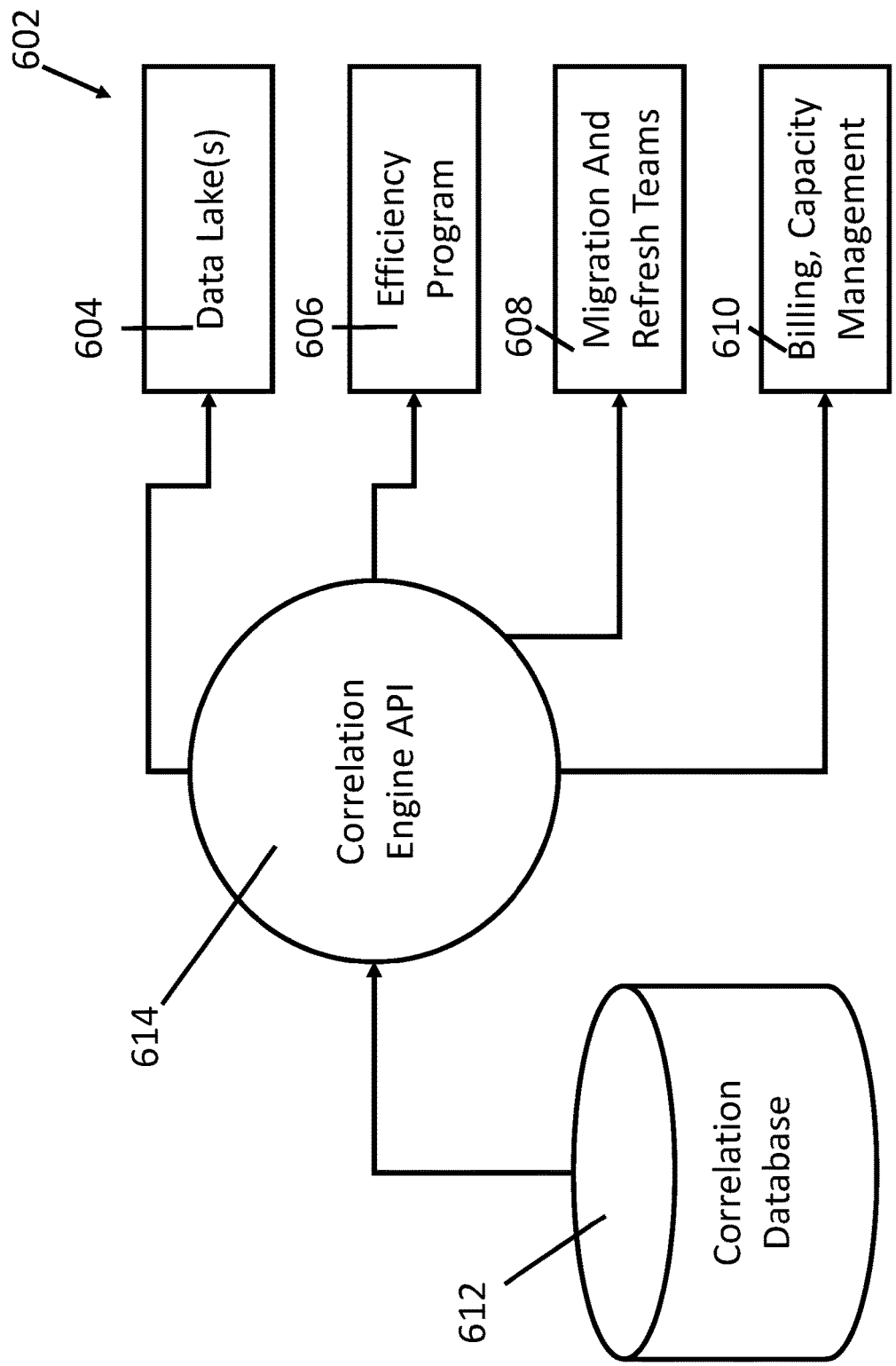
FIG. 6 is a diagram illustrating the flow of data from the storage correlation engine to various points of data consumption, according to an exemplary embodiment.

A flow of data 120 from the storage correlation engine 104 to various points of consumption or storage, according to an exemplary embodiment, is shown in FIG. 6. For example, there may be a plurality of data consumers 602, including, but not limited to data lakes 604, various organizational programs 606, data migration and refresh teams 608, and billing groups 610. In the illustrated example, the data is retrieved from a correlation database 612 and supplied to a storage correlation engine API 614. This API 614 may then be accessed by a plurality of consumers (e.g., devices and systems) in order to allow the consumers 602 to extract correlated data directly. Thus, the correlation engine may be configured such that its operation is transparent to data consumers.

While the present invention and associated inventive concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A method of correlating data stored at a plurality of storage locations, the method comprising:
   extracting first data representing an item of information from a first storage location;
   extracting second data representing the item of information from a second storage location; and
   using the first data and the second data to assess the validity of the second data by confirming that a data size of the second data is the same as a data size of the first data,
   wherein, when the second data is determined to be invalid:
      maintaining the first data; and
      discarding the second data; and
   wherein, when the second data is determined to be valid:
      converting the second data into third data having a standardized data format; and
      storing the third data as new data, and
   wherein confirming that the data size of the second data is the same as the data size of the first data comprises:
   receiving a count of reference objects in the second data;
   calculating an expected number of reference objects by determining a number of reference objects in the first data; and
   comparing the received count to the calculated number and determining a variance between the received count and the calculated number.

2. The method of claim 1, wherein using the first data and the second data to assess the validity of the second data comprises: confirming that there were no reported errors during a process of extracting the second data from the second storage location.

3. The method of claim 1, wherein using the first data and the second data to assess the validity of the second data further comprises:
   parsing the first data to obtain first parse data corresponding to one or more parse categories;
   parsing the second data to obtain second parse data corresponding to the one or more parse categories; and
   comparing the first parse data and the second parse data.

4. The method of claim 1, further comprising:
   providing an interface that permits direct access to the third data.

5. The method of claim 1, further comprising, if the second data is determined to be valid: logging the second data as historical data.

6. The method of claim 1, further comprising receiving information related to the first storage location wherein such information comprises:
port identifier data;
zoning data; and
storage location configuration data, and
wherein the information related to the first storage location is stored outside of the first storage location.

7. The method of claim 1, further comprising receiving information related to the first storage location wherein such information comprises:
fabric login data;
fabric channel name server data;
interface data; and
zoneset data.

8. The method of claim 1, further comprising: storing the third data in a third storage location.

9. The method of claim 8, wherein storing the third data in the third storage location further comprises:
moving a previously stored data value representing the item of information from the third storage location into a previous day storage table; and
storing the third data into the data storage location in the third storage location.

10. A system for correlating data from a plurality of data sources, the system comprising:
a processor;
a hardware data interface;
a correlation engine database;
a memory;
wherein the processor is in electronic communication with the hardware data interface, the correlation engine database, and the memory;
the memory comprising software instructions that, when executed by the processor, cause the processor to:
extract, using the hardware data interface, first data representing an item of information from a first storage location;
extract, using the hardware data interface, second data representing the item of information from a second storage location
receive, using the hardware data interface, information relating to the second data comprising:
file record quantity;
data source port data; and
a value representing a quantity of reference objects in the second data;
assess the validity of the second data using the first data by confirming that a data size of the second data is the same as a data size of the first data;
wherein, when the second data is determined to be invalid:
maintaining the first data; and
discarding the second data; and
wherein, when the second data is determined to be valid:
converting the second data into third data having a standardized data format; and
storing, using the hardware data interface, the third data as new data, and
wherein confirming that the data size of the second data is the same as the data size of the first data comprises:
receiving a count of reference objects in the second data;
calculating an expected number of reference objects by determining a number of reference objects in the first data; and
comparing the received count to the calculated number and determining a variance between the received count and the calculated number.

11. The system of claim 10, wherein using the first data and the second data to assess the validity of the second data comprises: confirming that there were no reported errors during a process of extracting the second data from the second storage location.

12. The system of claim 10, wherein using the first data and the second data to assess the validity of the second data further comprises:
parsing the first data to obtain first parse data corresponding to one or more parse categories;
parsing the second data to obtain second parse data corresponding to the one or more parse categories; and
comparing the first parse data and the second parse data.

13. The system of claim 10, wherein the third data is stored in a third storage location.

14. The system of claim 13, wherein the third data is stored in the third storage location by:
moving a previously stored data value representing the item of information from the third storage location into a previous day storage table; and
storing the third data into the data storage location in the third storage location.

15. The system of claim 10, further comprising software instructions that, when executed by the processor, cause the processor to:
provide an interface that permits direct access to the third data.

16. The system of claim 10, wherein the software instructions comprise instructions which, when executed by the processor, cause the processor to receive information related to the first storage location comprising:
port identifier data;
zoning data; and
storage location configuration data, and
wherein the information related to the first storage location is stored outside of the first storage location.

17. The system of claim 10, wherein the software instructions comprise instructions which, when executed by the processor, cause the processor to receive information related to the first storage location comprising:
fabric login data;
fabric channel name server data;
interface data; and
zoneset data.

18. A non-transitory computer readable medium configured to store instructions for correlating data stored at a plurality of storage locations, wherein when executed, the instructions cause a processor to perform the following:
extracting first data representing an item of information from a first storage location;
extracting second data representing the item of information from a second storage location; and
using the first data and the second data to assess the validity of the second data by confirming that a data size of the second data is the same as a data size of the first data,
wherein, when the second data is determined to be invalid, the instructions, when executed, cause the processor to further perform the following:
maintaining the first data; and
discarding the second data; and wherein, when the second data is determined to be valid, the instructions, when executed, cause the processor to further perform the following:
   converting the second data into third data having a standardized data format;
   storing the third data as new data in a third storage location; and
   provide an interface that permits direct access to the third data, and
wherein confirming that the data size of the second data is the same as the data size of the first data comprises:
receiving a count of reference objects in the second data;
calculating an expected number of reference objects by determining a number of reference objects in the first data; and
comparing the received count to the calculated number and determining a variance between the received count and the calculated number.

19. The non-transitory computer readable medium according to claim 18, wherein storing the third data in the third storage location further comprises:
   moving a previously stored data value representing the item of information from the third storage location into a previous day storage table; and
   storing the third data into the data storage location in the third storage location.

20. The non-transitory computer readable medium according to claim 18, wherein using the first data and the second data to assess the validity of the second data further comprises:
   parsing the first data to obtain first parse data corresponding to one or more parse categories;
   parsing the second data to obtain second parse data corresponding to the one or more parse categories; and
   comparing the first parse data and the second parse data.

* * * * *